United States Patent [19]

Nossen

[11] Patent Number: 4,628,286

[45] Date of Patent: Dec. 9, 1986

[54] DIGITAL FREQUENCY MODULATOR

[75] Inventor: Edward J. Nossen, Cherry Hill, N.J.

[73] Assignee: RCA Corporation, Princeton, N.J.

[21] Appl. No.: 724,310

[22] Filed: Apr. 17, 1985

[51] Int. Cl.$^4$ ............................................... H03C 3/00
[52] U.S. Cl. .................................. 332/9 R; 332/16 R; 332/31 R; 455/110
[58] Field of Search ................... 332/9 R, 16 R, 31 R; 455/110; 375/62, 64, 45, 47; 328/35, 181, 185

[56] References Cited

U.S. PATENT DOCUMENTS

| | | | |
|---|---|---|---|
| 3,170,127 | 2/1965 | Cramer | 332/41 |
| 3,689,914 | 9/1972 | Butler | 340/347 DA |
| 3,987,374 | 10/1976 | Jones | 332/9 R |
| 4,170,764 | 10/1979 | Salz et al. | 332/17 |
| 4,206,424 | 6/1980 | Nossen | 332/9 R |
| 4,206,425 | 6/1980 | Nossen | 332/19 |
| 4,331,941 | 5/1982 | Kovalick et al. | 332/31 R |
| 4,355,289 | 10/1982 | Beyer et al. | 332/17 |
| 4,484,296 | 11/1984 | Treise et al. | 364/607 |
| 4,562,414 | 12/1985 | Linder et al. | 332/9 R |
| 4,584,541 | 4/1986 | Nossen | 332/16 R |

FOREIGN PATENT DOCUMENTS

0166333 12/1980 Japan ................................. 332/16 R

Primary Examiner—Eugene R. LaRoche
Assistant Examiner—Robert J. Pascal
Attorney, Agent, or Firm—Joseph S. Tripoli; Robert L. Troike; William H. Meise

[57] ABSTRACT

An MSK modulator includes a source of digital sawtooth signals having a recurrence rate equal to the desired recurrence rate of the unmodulated carrier. The digital sawtooth signal is applied to an adder together with a phase control digital signal. The phase control digital signal phase-shifts the digital sawtooth signal. The phase-shifted digital sawtooth signal is applied to a sine ROM to produce a digital sinusoid with an unmodulated recurrence rate equal to the recurrent rate of the digital sawtooth signal. When the phase control signal is an accumulated signal, the digital sinusoid is frequency-modulated. The phase control signal for MSK modulation is a ramp signal generated by a controlled accumulator. The accumulator includes a controllable clocked adder/subtractor, the output of which is coupled by way of a register back to an input. The other input of the adder/subtractor is coupled to receive a fixed ramp rate controlling word. At each clock cycle, the accumulator adds (subtracts) the ramp rate word from the sum under the control of the MARK (SPACE) information content of the information signal to form a two-frequency MSK modulation. More general frequency modulation is accomplished by an accumulator with an input word which responds to the instantaneous amplitude of the information signal. A clocked delay and a subtractor indicate the direction of frequency deviation.

15 Claims, 17 Drawing Figures

DIGITAL FREQUENCY MODULATOR

This invention relates to a modulator useful for frequency modulation for MSK modulation using digital techniques of implementation.

Frequency modulation (FM) transmission systems are well known, and have been used commercially for many years. In frequency modulation, the frequency of a carrier is changed in response to the amplitude of the modulating signal. The information signal may be an analog signal such as an audio signal or it may be a digital signal.

When digital signals frequency modulate a carrier, the resulting modulation is known as frequency-shift keying. A bilevel digital information signal takes one of two states depending upon the state of digital information signal. According to one convention, a logic HIGH level is called a MARK and a logic LOW is termed a SPACE. In frequency shift keying, a MARK is represented by a first frequency and a SPACE by a second frequency. Minimum-shift keying or MSK is a variant of FSK in which the deviation between the MARK and SPACE-representative modulated frequencies is one-half of the bit rate. For example, for the case of a 1200 bits per-second (b/s) data rate, the deviation of the carriers is 600 Hz, which corresponds to ±300 Hz from the nominal carrier frequency. MSK modulation is advantageous because it is efficient in terms of the ratio of data rate to channel bandwidth (bits/sec/hertz) among those signals which are noncoherently orthogonal. Orthogonal signals are those that do not interfere with one another in the process of detection. For example, in noncoherent MSK signalling using envelope detectors, the two FSK signals at frequencies $F_1$ and $F_2$ are said to be noncoherently orthogonal if, when a tone of $F_1$ is transmitted, the sampled envelope of the output of the receiving filter tuned to $F_2$ is zero, or has no cross talk.

It is generally desirable to supplant analog modulation systems with digital modulation systems. In the case of frequency modulation, the technique used to change the carrier frequency in analog systems includes the use of voltage variable capacitance diodes to change the frequency of the oscillator. The capacitance versus voltage characteristic of such diodes tends to be nonlinear, which adversely affects linearity of modulation. In the case of MSK, linearity of modulation is not too important, since only two frequencies are involved. However, the two modulation frequencies must be maintained at a precise frequency separation in order to avoid an increase in the data transmission error rate.

Coherent demodulation of MSK signals for improved noise performance requires that the transmitted signal be coherently generated. In prior art MSK modulators, sine and cosine carriers are generated, each is phase modulated and multiplied by a half sinusoid weighting function. The modulated carriers are then linearly summed to produce a constant envelope, continuous phase frequency shift keyed signal.

A simple digital arrangement for accurately generating angle modulated signals is desirable.

SUMMARY OF THE INVENTION

An angle modulator includes a source of digital sawtooth signal having a recurrence rate equal to the rest recurrence rate of a carrier to be angle-modulated. A source of digital information signal is coupled to a digital ramp signal generator for generating a digital ramp signal having instantaneous slope and polarity. At least the polarity of the digital ramp signal is controlled in response to the digital information signal. An adder is coupled to the source of digital sawtooth signal and to the ramp generator for generating a continuous phase frequency modulated digital sawtooth signal. A memory including addressable memory locations is coupled to the adder for being addressed by the frequency modulated digital sawtooth signal. Each of the memory locations of the memory which is accessed is preprogrammed with a portion of a sinusoidal signal. The output of the memory is a frequency modulated sinusoidal signal.

DESCRIPTION OF THE INVENTION

A phase modulator designated generally as 10 in FIG. 1 includes a digital sawtooth signal generator 20, which includes a source 22 of a digital frequency number which establishes the frequency of the carrier signal being modulated, as described below. The digital frequency number is preselected and does not ordinarily change during operation. The frequency number is applied to a clocked adder or summer 24 in which the digital number is added to the digital value applied to a second input of the adder over a conductor set 26. Conductor set 26 may include more than a single conductor, as suggested by the slash mark, for carrying multiple simultaneous bits. For simplicity, such sets will hereafter be termed simply "conductor" and each terminal to which such a conductor connects will be termed a "terminal", no matter how many conductors terminate therein. Adder 24 adds together at each clock cycle the digital frequency number and the digital signal applied to its second input over conductor 26 to produce a sum signal which is applied to a register or latch 28 which latches the sum signal and which applies the latched sum signal back over conductor 26 to the input of adder 24. In this arrangement, a digital number is generated at the output of register 28 which increments by the frequency number at each clock cycle. Thus, the digital number on conductor b is a digital number representing or equivalent to a quantized sawtooth signal such as sawtooth signal 212 of FIG. 2. The quantization of the sawtooth signal is suggested by the various levels of signal 312 of FIG. 3. It is of course understood that the digital representation is merely by means of a plurality of ones and zeros as is well known in the art. The monotonically increasing digital number on conductor b eventually causes register 28 to overflow and to start again from a near-zero value, thereby causing the digital number on conductor b to recurrently drop to or near zero value and to increment during each clock cycle by the magnitude of the digital frequency number. The number of stages of register 28, the clock recurrence rate and the magnitude of the digital frequency number are selected so that the digital number on conductor b produces a sawtooth-representative signal which recurs at the recurrence rate of each cycle of the unmodulated carrier to be generated. A clock signal generator illustrated as 30 produces on conductor labeled a clock signals which are at a frequency which is high relative to the frequency defined by the recurrence rate of the digital sawtooth signal. The clock signals are applied to adder 24, register 28 and to other timed elements in modulator 10.

Figure 2:
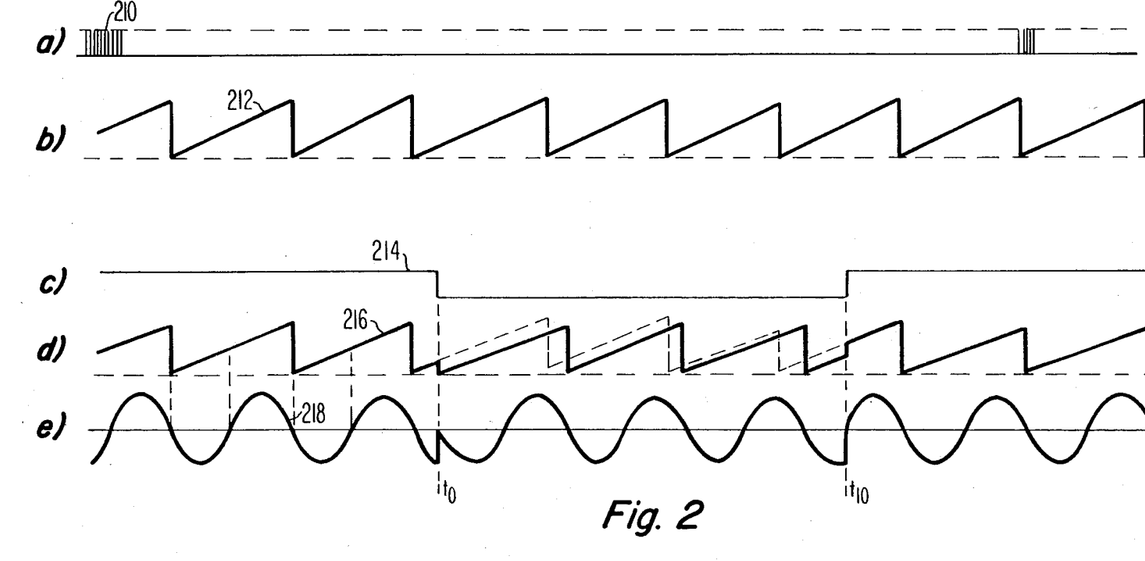
FIGS. 2 and 3 illustrate amplitude-time plots of signal waveforms occurring in the arrangement of FIG. 1 during operation.

The digital sawtooth representative signal on conductor b is applied to a first input of a clocked adder or summer 32. A digital information or modulating signal is applied to a second input of adder 32 over conductor c. The digital information signal may be generated from an analog information signal by an analog-to-digital converter (ADC) 33. Adder 32 at each clock cycle adds together the current value of the digital sawtooth signal applied from conductor b and the digital information signal from conductor c to produce a phase-shifted sawtooth signal on conductor d. Adder 32 overflows when the sum of the digital sawtooth signal and the digital information signal exceeds the peak value of the digital sawtooth signal alone. This may be better understood by reference to FIGS. 2c and 2d. In FIG. 2c, two-level waveform 214 represents in simplified form a signal which is to phase-modulate the carrier. The desired modulation as illustrated is simply a first phase before time $t_0$, a second phase in the interval $t_0$–$t_{10}$ and a return to the original phase condition at times after time $t_{10}$. Waveform 216 in the interval prior to time $t_0$ represents the sawtooth output of adder 32 in-phase with the input signal 212, thereby indicating that no phase shift has taken place, or that the magnitude of the digital information signal applied to adder 32 over conductor c has zero magnitude. At time $t_0$, a digital value is applied over conductor c to adder 32 and is added to the value of the sawtooth. Since the digital information signal on conductor c has a constant value, its addition to the sawtooth signal represents a simple magnitude offset, such as the offset indicated at time $t_0$. As illustrated, the added digital information signal has a negative value which happens to reduce the sawtooth signal to a value near zero at time $t_0$, and consequently the digital information as illustrated has an approximate magnitude of one-fourth of the peak value of the sawtooth. For this particular value of digital information signal, a phase delay of the sawtooth 216 relative to the digital sawtooth 212 results, as can be seen by comparing waveform 216 with the dashed line in the interval $t_0$–$t_{10}$ representing sawtooth 212. After time $t_{10}$, the digital information signal returns to zero value, and the negative magnitude no longer affects the sawtooth waveform, which thereupon makes a step increase in magnitude so as to become once again congruent with digital sawtooth waveform 212. Thus, it can be seen that adder 32 causes a phase shift of the sawtooth signal which depends upon the magnitude of the modulating signal. In general, for more complex modulating signals than signal 214, more complex phase modulation will occur.

Figure 1:
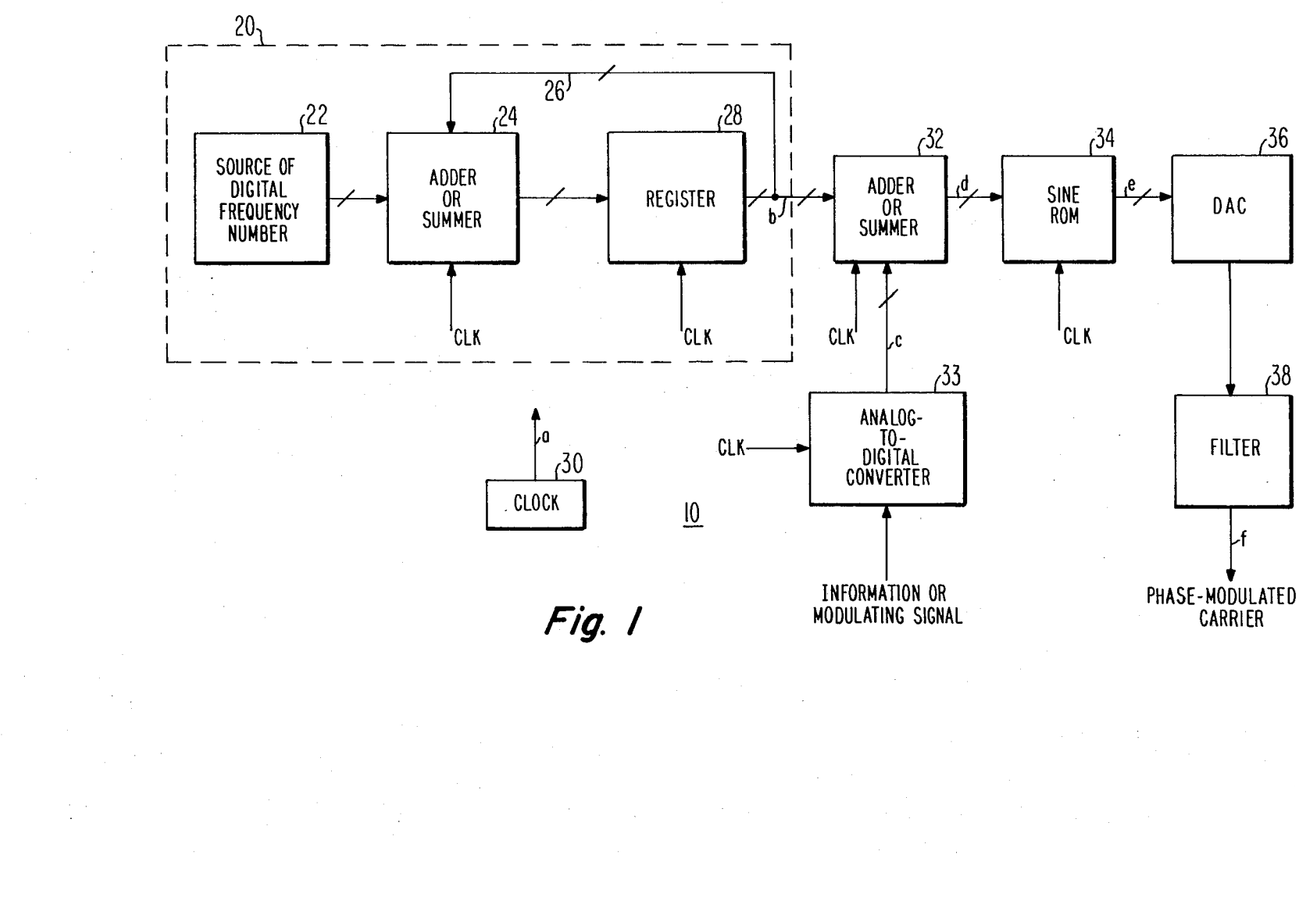
FIG. 1 is a block diagram of a phase modulator aiding in understanding the invention.
Figure 3:
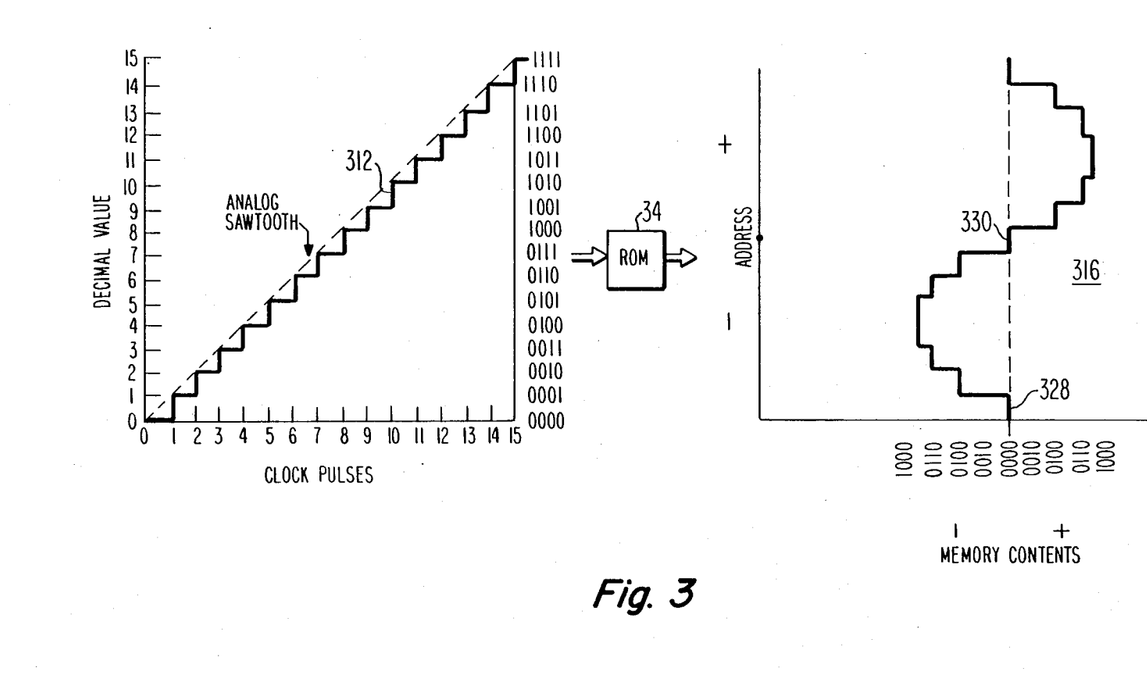

The phase modulated signal produced at the output of adder 32 in FIG. 1 is applied over a conductor d to a sine ROM 34. ROM 34 is an addressable memory which is addressed by the digital signals on conductor d and which is preprogrammed with values representing a sinusoid. This is more easily understood by reference to FIG. 3. In FIG. 3, waveform 312 represents in analog form the value of a sawtooth signal for various clock pulses. Actual conversion of digital signals to analog occurs at digital-to-analog converter 36. The analog value represented by the sawtooth is indicated at the left of waveform 312, and the corresponding 4-bit digital value is represented on the right. The 4-bit values represented by digital signal 312 are illustrated as being applied as addresses to ROM 34, and the corresponding preprogrammed values are illustrated by waveform 316. For example, the memory locations of ROM 34 corresponding to addresses 0000 and 1000 are each preprogrammed with digital values 0000, and correspond to levels 328 and 330, respectively. These are the zero crossings of the equivalent sinusoid. Thus, as sawtooth 312 recurrently takes excursions from 0000 to 1111, ROM 34 outputs digital numbers including numbers representative of zero crossings of the sinusoid. During the first or lower part of sawtooth 312, addresses 0000 to 0110 applied to ROM 34 produce outputs from the ROM representing negative values of a sinusoid. The second or upper portion of sawtooth 312, having values ranging from 1001 to 1111, produce memory outputs which represent the values of the positive half-cycle of the sinusoid. Naturally, the number of quantization levels is selected to provide as accurate a representation of a sinusoid as may be desired. Thus, the recurrent excursions from 0000 to 1111 of sawtooth 312 produces recurrent negative and positive-going excursions of the digitized sinusoid 316.

Referring once again to FIG. 1, the recurrent sawtooth signal 212 applied to sine ROM 34 produces on conductor e a digital signal representative of a sinusoid 218, illustrated in FIG. 2e. The return to zero value of sawtooth 216 at time $t_0$ as a result of phase modulation causes the digital address applied to sine ROM 34 to drop to its initial value, and thereby causes sine ROM 34 to produce a digital signal representing zero value for the first clock cycle after time $t_0$. This zero value represents a first zero-crossing of sinusoid 218. Subsequent to time $t_0$, waveform 216 is phase shifted, and complete phase shifted sinusoids are produced by sine ROM 34 until later time $t_{10}$, at which time there is an abrupt positive-going change in magnitude of waveform 216 to a value which is half-way up the sawtooth, thereby causing sine ROM 34 to produce the corresponding portion of a sinusoid, which happens to again be near zero value. Thus, that portion of sinusoid 218 preceding time $t_0$ is in-phase or coherent with that portion following time $t_{10}$. The phase shifting of sawtooth address wavefrom 216 addressing ROM 34 causes a corresponding phase shift of the digital output signal representing a sinusoid.

The digital output signal of sine ROM 34 is applied to a digital-to-analog converter (DAC) 36 to produce a quantized analog sinusoid corresponding to the digital signal. Quantizing noise is removed by a filter 38 to produce on output conductor f a sinusoidal carrier, the recurrence rate of which tracks the recurrence rate of sawtooth signal 212, with phase modulation imparted by the information signal. As so far described, the arrangement of FIG. 1 is a phase modulator such as that described in U.S. patent application Ser. No. 687,546, filed Dec. 28, 1984, in the name of E. J. Nossen, now U.S. Pat. No. 4,584,541.

Figure 4:
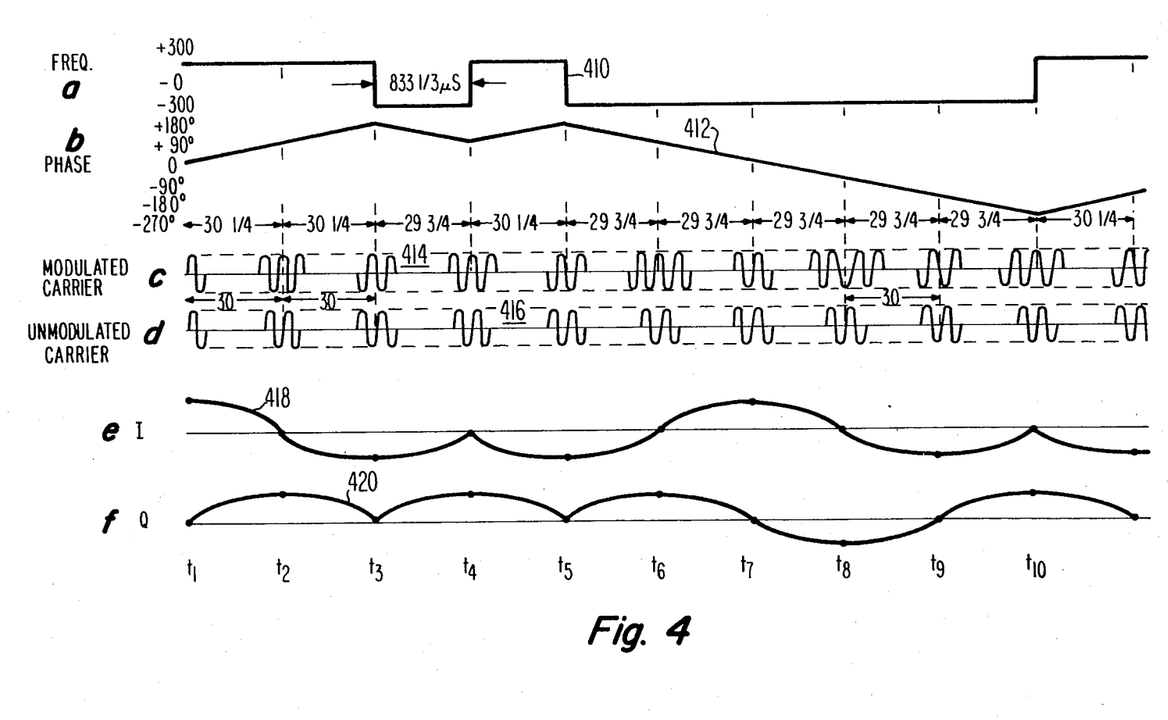
FIG. 4 illustrates amplitude-time plots of MSK signals aiding and understanding the invention.

An arbitrarily selected digital information signal 410 illustrated in FIG. 4a has a 1200 bit-per-second data rate, corresponding to a bit duration of 833 ⅓ microseconds (μS). As illustrated in FIG. 4a, the MARK (logic HIGH) portions have a frequency above the nominal carrier frequency and the SPACE portions have a frequency below the nominal carrier frequency. For an MSK signal, the total deviation is one-half the data rate. For a data rate of 1200 BPS the total deviation is 600 Hertz (Hz), or ±300 Hz. Data signal 410 dwells only at a MARK or at a SPACE, and has no dwell time at the carrier frequency. Consequently, the phase of the frequency modulated carrier relative to the unmodulated carrier is a ramp having a positive slope during MARK intervals and a negative slope during SPACE intervals. For MSK modulation the slope of ramp 412 is 90° per bit interval. For example, in the interval $t_1$–$t_2$ during which the modulated MSK carrier represents a MARK, the phase of the modulated carrier relative to the unmodulated carrier increases from zero to plus 90°. As illustrated in FIG. 4c and 4d, this means that the modulated carrier 414 is at a frequency such that an even number of cycles plus ¼ cycle occurs during each bit interval, while the unmodulated carrier 416 is at a frequency which results in only an integer number of cycles during that same interval. As illustrated, the integer number of cycles is 30, which defines the unmodulated carrier frequency as $$f_c = 30 \text{ cycles}/833.33 \ (10^{-6})\text{sec} = 36 KHz$$

The phase of modulated carrier 414 continues to increase by a further 90° during time interval $t_2$–$t_3$, resulting in a further interval having 30¼ cycles. As a result, at time $t_3$ the modulated carrier and the unmodulated carrier are mutually out-of-phase. During the interval $t_3$–$t_4$, the information signal 410 defines a SPACE. During SPACE intervals, the slope of phase characteristic 412 is −90° per bit interval. Consequently, during the interval $t_3$–$t_4$ the phase returns to the same phase which existed at time $t_2$. FIG. 4e illustrates as 418 a plot of the multiplicative product of MSK modulated carrier 414 and unmodulated carrier 416, and FIG. 4f illustrates as 420 a plot of the multiplicative product of MSK modulated carrier 414 and an unmodulated carrier in phase quadrature with carrier 416.

Figure 5:
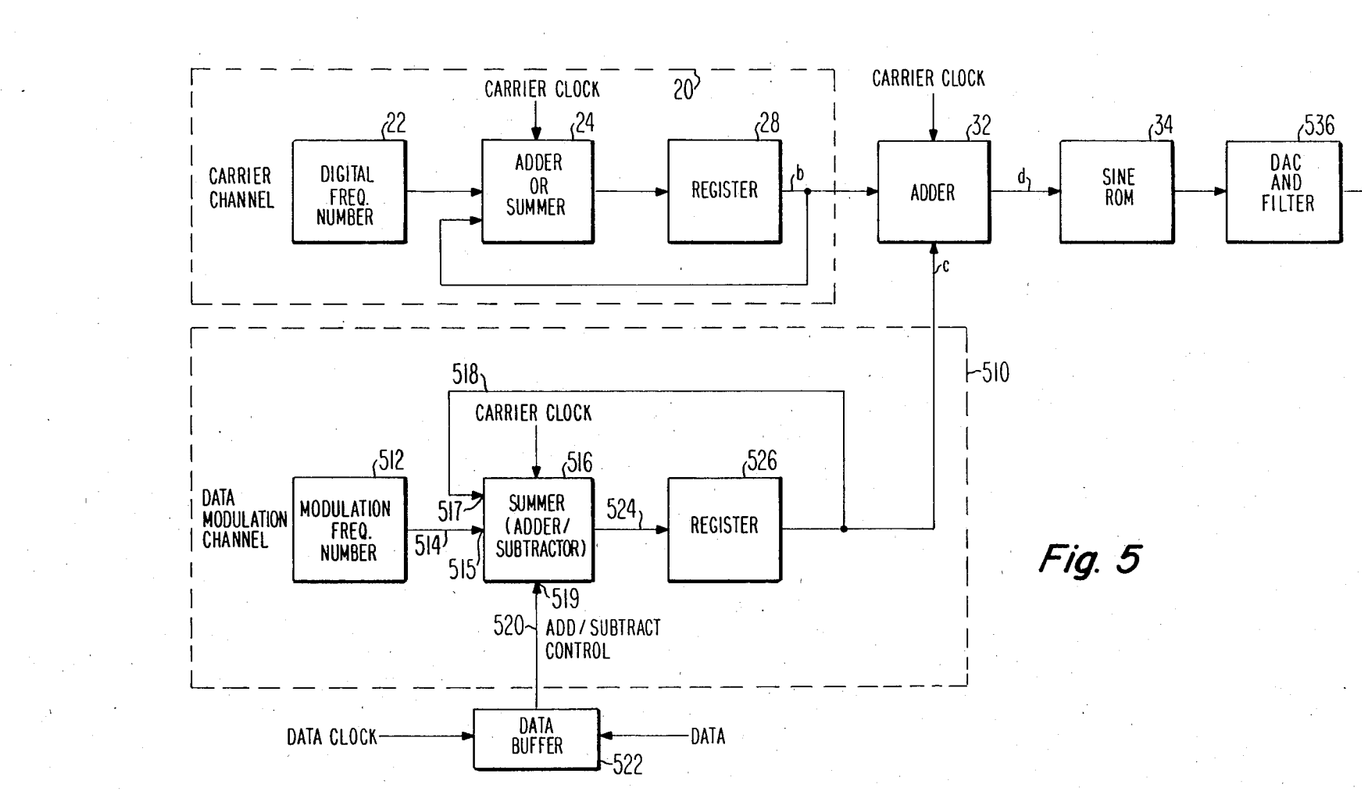
FIG. 5 is a block diagram of an angle modulator according to the invention.

FIG. 5 is a block diagram illustrating a frequency modulator according to the invention adapted for generating two modulated frequencies. In FIG. 5, elements corresponding to those of FIG. 1 are designated by the same reference numbers. As described previously, adder 32 adds to the digital sawtooth signal on conductor b at each clock cycle the value of each digital signal applied to its second input over conductor c. This results in a phase shift of the sawtooth signal and a corresponding phase shift of the sinusoidal signal produced by ROM 34. As described in conjunction with FIG. 4, a fixed frequency offset or deviation corresponds to a linear phase change over the interval in question. The data modulation channel portions of the receiver within dotted block 510 of FIG. 5 receives a digital information signal such as 410 of FIG. 4a and converts it into a linearly increasing or decreasing ramp signal which is applied over conductor c to the second input of adder 32. The linearly increasing or decreasing amplitude of the ramp signal causes a linearly increasing or decreasing phase characteristic of the sawtooth signal on output conductor d of adder 32. Such a phase characteristic corresponds to frequency modulation.

Data modulation channel 510 includes a modulation frequency number register 512 which stores a fixed number which establishes the magnitude of the slope of the ramp signal. The plot of the ramp signal is identical in appearance to phase plot 412 of FIG. 4b, and is not distinguished hereafter. The frequency number is applied over a conductor 514 to a summer (adder/subtractor) 516 which receives carrier clock signals from a source (not illustrated) and which at each carrier clock pulse sums the digital signal applied to its first input terminal 515 by way of conductor 514 with a digital signal applied to a second input terminal 517 over a conductor 518. Control of the nature of the summing is established by an add/subtract control signal applied to the control input terminal 519 of summer 516 over a conductor 520 from a data buffer 522. The summed output signal from summer 516 is applied over a conductor 524 to a register 526. Register 526 receives the summed signal and applies the sum signal to adder 32 over conductor c and feeds it back to the second input of summer 516 over conductor 518. In operation, data such as 410 of FIG. 4a is applied to data buffer 522 and clocked in at the data rate. The magnitude of the data signal applied over conductor 520 controls the add/subtract state of summer 516. For example, during those intervals in which buffer 522 applies a logic HIGH level to control input terminal 519 of summer 516, summer 516 at each carrier clock cycle adds to the signal applied to first input terminal 518 the modulation frequency number applied to input terminal 515 to produce a linearly increasing digital signal which is latched through register 526 for application to adder 32. During logic LOW levels, summer 516 at each carrier clock cycle subtracts from the digital value applied to its second input terminal 517 the modulation frequency number applied to its first input terminal 515 to produce a linearly decreasing signal for application to conductor c. As described previously, this results in generation of one of two frequencies in response to the instantaneous value of the information signal.

Figure 6:
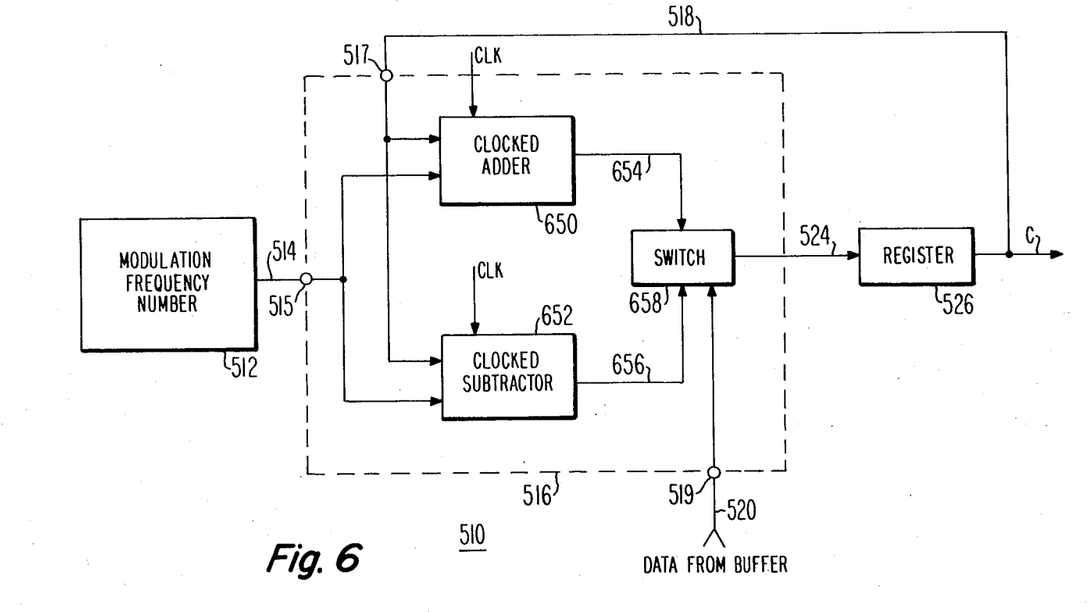
FIG. 6 is a block diagram of a portion of the arrangement of FIG. 5 suited for MSK modulation.

FIG. 6 illustrates data modulation channel 510 in more detail in an embodiment suited for MSK operation. In FIG. 6, elements corresponding to those of FIG. 5 are designated by the same reference numbers. Summer 516 in FIG. 6 includes a clocked adder 650 and a clocked subtractor 652, each of which is coupled to receive at a first input terminal the modulation frequency number applied from modulation frequency number register 512 by way of conductor 514, and at a second input the fed-back ramp signal by way of conductor 518 and terminal 517. Thus, at each carrier clock cycle, the incremented value of the ramp is available on conductor 654 at the output of adder 650 and the decremented value of the ramp is available at conductor 656 at the output of subtractor 652. An electronic single pole, double throw switch illustrated as 658 is coupled to conductors 654 and 656 to receive the incremented and decremented values, respectively. Switch 658 selects either the incremented or decremented value under the control of the data signal for application over conductor 524 to register 526.

Figure 7:
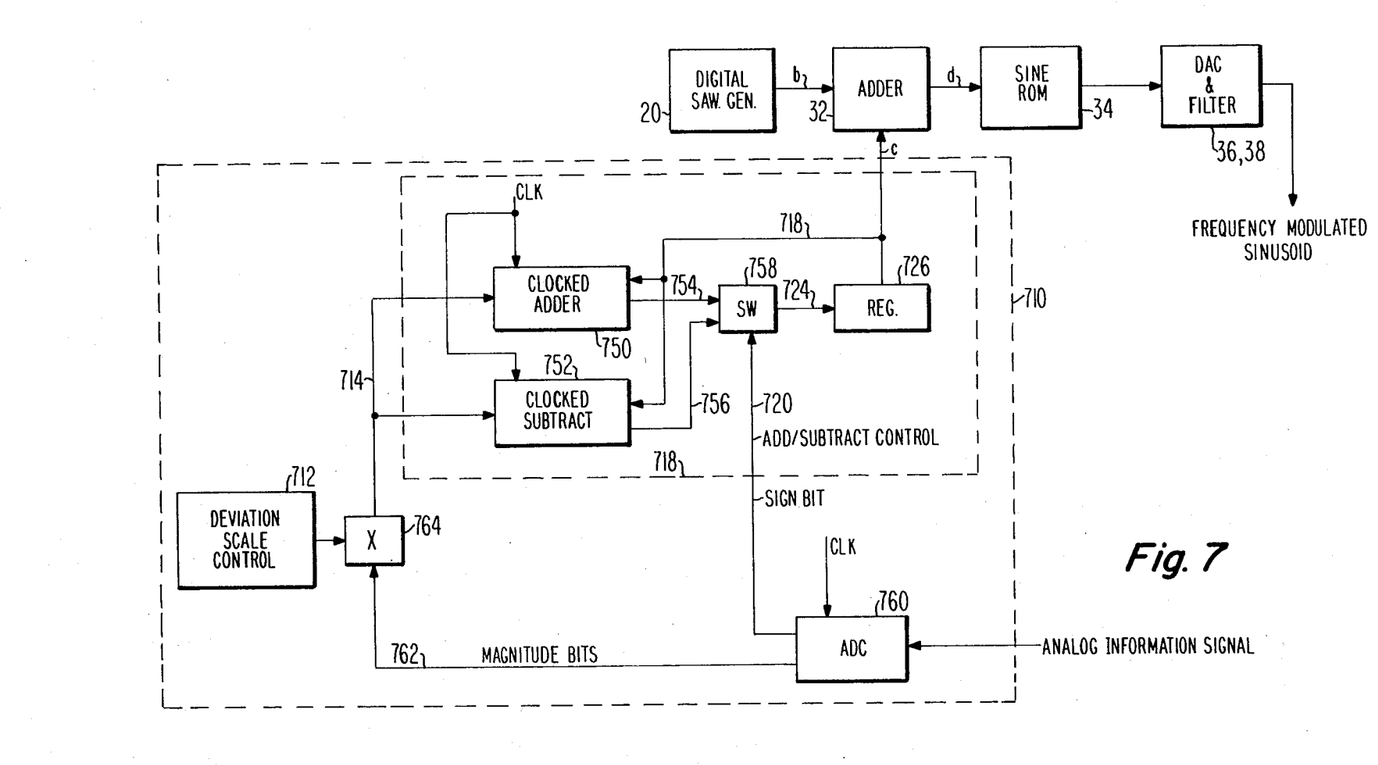
FIG. 7 is a block diagram of an alternative to the arrangement of FIG. 6 which is suited for general frequency modulation.

The arrangement of FIG. 5 receives a digital information signal and produces, in response to logic HIGH and LOW levels, frequency modulation of a carrier with a deviation which is independent of the magnitude of the logic HIGH and LOW levels. A more general type of frequency modulator suitable for use with an analog signal is illustrated in block diagram form in FIG. 7. In FIG. 7, elements corresponding to those of FIGS. 1 are designated by the same reference numerals. The arrangement of FIG. 7 includes a digital sawtooth generator 20 which applies a digital sawtooth signal having a recurrence rate equal to the rate of the unmodulated carrier over a conductor b to adder 32. Adder 32 adds to the sawtooth signal a signal applied over conductor c which will be termed a ramp signal, and produces on conductor d a digital sawtooth signal phase-shifted in response to the ramp signal for application to sine ROM 34, DAC 36 and filter 38 to produce a frequency modulated sinusoid. Unlike the ramp signal generated by the arrangement of FIG. 6, the ramp signal produced in FIG. 7 has a variable slope over a few clock cycles because of the relatively rapid change of the modulating signal at high modulation rates. For many modulating signals, the appearance over a few clock cycles will approximate that of a ramp. For consistency, the signal of FIG. 7 is termed a ramp.

In FIG. 7, modulation channel 710 includes a summer designated generally as 716 which includes a clocked adder 750 and a clocked subtractor 752, the outputs of which are coupled by conductors 754 and 756, respectively, to alternate inputs of a singe pole, double throw switch 758 which selects an incremented or decremented signal for application to phase register 726 under the control of an add/subtract control signal applied over a conductor 720. Register 726 latches the signal for application over conductor c to an input of adder 32 and over conductor 718 to the feedback input terminal of adder 750 and subtractor 752. As so far described, summer 718 is very similar to summer 716 of FIG. 6, and operates in a similar fashion.

For general frequency modulation it must be possible to select more than two modulation frequencies. Ideally, there should be as many modulation frequencies as the bit depth of the digital system permits (for example, an 8-bit system having 256 quantization levels would allow 256 modulation frequencies). The analog information signal is applied to an analog-to-digita converter (ADC) 760 where it is converted to a digital signal with a given bit depth. The bit depth establishes the number of quantization levels. The desired control of the number of frequencies is accomplished by applying the magnitude portions of the digitized information signal over a conductor 762 to a multiplier 764. A deviation scale control word latch 712 appies a predetermined multiplying signal to a second input of multiplier 764 to multiply or scale the digitized analog information signal to provide the desired peak deviation. The scaled digitized information signal is applied over conductor 714 to inputs of adder 750 and subtractor 752 for incrementing and decrementing the ramp signal by an amount responsive to the magnitude of the information signal.

The add/subtract control signal represents the sign of the digitized information signal. For example, the analog information may be unchanging over a clock cycle, may increase (become more positive) or decrease (become more negative). This information establishes the direction of frequency modulation. For example, if the analog information is increasing, the frequency modulated carrier should increase in frequency, and if the analog information is decreasing, the modulation carrier frequency should decrease. Naturally, the opposite convention could be used. The magnitude of the digitized information signal from ADC 760 is applied to multiplier 764 which controls the modulation slope or frequency. The sign bit of the digitized information signal from ADC 760 is applied to switch 758. The sign bit may be plus or minus, depending upon whether the digitized information signal is positive or negative. The sign bit is applied over conductor 720 to switch 758 in order to control the instantaneous incrementing or decrementing of the ramp signal, thereby making the frequency positive or negative relative to the carrier frequency.

Figure 8:
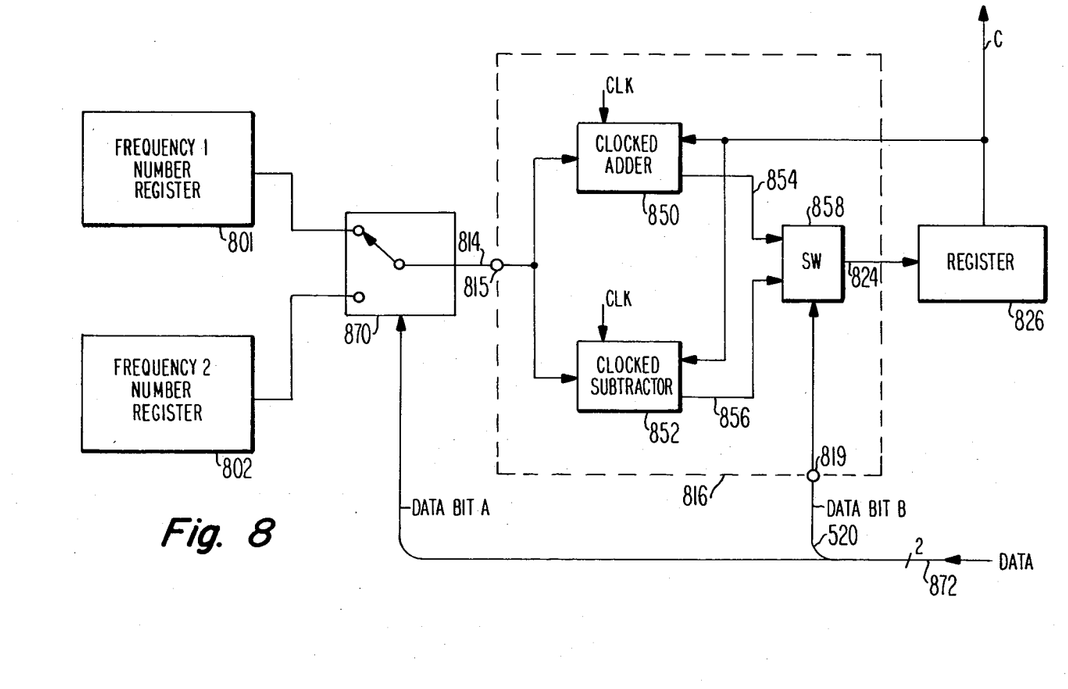
FIG. 8 illustrates a portion of multifrequency continuous phase frequency shift keying modulator according to the invention.

FIG. 8 illustrates a portion of a multifrequency continuous phase frequency shift keying modulator according to the invention. In FIG. 8, 801 and 802 are registers loaded with first and second frequency numbers. Registers 801 and 802 are coupled by way of a single pole, double throw switch 870 and a conductor 814 to input terminal 815 of a summer 816. Summer 816 corresponds to summers 516 and 716, and includes a clocked adder 850 and a clocked subtractor 852 to the inputs of which conductor 814 is coupled. Adder 850 and subtractor 852 receive second input signals from register 826 over conductor c, and produce incremented and decremented signals, respectively, which are coupled to register 826 by a switch 858 under the control of a data bit applied over a conductor 520. In the absence of a second frequency word register and selection switch 870, the arrangement is identical with the arrangement of FIG. 6 and produces continuous phase frequency shift keyed modulation having two frequencies. Two bits of data at a time applied to conductor 872 provides sufficient information to control switch 858 to select a frequency above or below the nominal carrier, and also to select one of the two operating positions of switch 870, and thereby select one of frequency numbers 1 or 2. This allows selection of two frequencies above the nominal carrier and two frequencies below the nominal carrier, in response to the 2 bits of information.

Other embodiments of the invention will be apparent to those skilled in the art. For example, digital summers having forms other than that of FIG. 6 may be used. Any generator may be used to generate the basic carrier-rate digital sawtooth signal. Serial or parallel digital processing may be used interchangeably. More complex switching schemes than that shown in FIG. 8 together with a larger number of frequency number memories make it possible to switch among a larger number of modulated frequencies than four.

What is claimed is:
1. A frequency modulator, comprising:
 a source of digital sawtooth signal having a recurrence rate equal to the rest recurrence rate of the carrier to be frequency-modulated;
 a source of digital information signal;
 digital ramp signal generating means coupled to said source of digital information signal for generating a digital ramp signal having slope and polarity, at least said polarity being controlled in response to said digital information signal;
 adding means coupled to said source of digital sawtooth signal and to said digital ramp signal generating means for adding together said digital sawtooth signal and said digital ramp signal for generating a frequency-modulated digital sawtooth signal; and
 memory means including addressable memory locations, said memory means being coupled to said adding means for being addressed by said frequency-modulated digital sawtooth signal, each of said memory locations which is accessed being preprogrammed with a portion of a sinusoidal signal, whereby said memory means produces a frequency-modulated sinusoidal signal.

2. A modulator according to claim 1, wherein said source of digital sawtooth signal comprises:
  a source of digital carrier frequency control word;
  an adder including a first digital input signal terminal coupled to said source of digital carrier frequency control word and also including a second digital input signal terminal for adding together said digital carrier frequency control word and a second digital word applied to said second digital input signal terminal means for producing an incremented digital signal; and
  accumulator means including input terminals coupled to said adder and also including output terminal means coupled to said second digital input signal terminal of said adder for receiving said incremented digital signal and for coupling said incremented digital signal to said output terminal means for closing a loop whereby said digital sawtooth signal is generated at said output terminal means.

3. A modulator according to claim 2 further comprising a source of clock signal having a pulse recurrence rate greater than said recurrence rate of said sawtooth signal, and wherein said adder and said accumulator means are coupled to said source of clock signals for being clocked thereby for establishing the rate at which said incremented digital signal is incremented.

4. A modulator according to claim 3 wherein said accumulator means has an overflow level, and said recurrence rate of said digital sawtooth signal depends upon the magnitude of said digital carrier frequency control word, said pulse recurrence rate of said source of clock signals, and said overflow level.

5. A modulator according to claim 4 wherein said adding means overflows at a level equal to said overflow level of said accumulator means.

6. A modulator according to claim 1 wherein said digital ramp signal generating means comprises:
  a source of digital frequency modulation deviation word;
  a summer including a first digital input signal terminal means coupled to said source of digital frequency modulation deviation word and also including second digital input signal terminal means and further including control input terminal means coupled to said source of digital information signal for adding together said digital frequency modulation deviation word and a second digital word applied to said second digital input signal terminal means for producing incremented and decremented digital signal under the control of said digital information signal;
  accumulator means including input terminals coupled to said summer and also including output terminal means coupled to said second digital input signal terminal means of said summer for receiving said incremented and decremented digital signal and for coupling said incremented and decremented digital signal to said output terminal means for closing a loop whereby said digital ram signal is generated at said output terminal means.

7. A modulator according to claim 6 further comprising a source of clock signal having a pulse recurrence rate, and wherein said summer and said accumulator means are coupled to said source of clock signals for being clocked thereby for establishing the rate at which said incremented and decremented digital signals are incremented and decremented.

8. A modulator according to claim 6 further comprising control means coupled to said source of digital frequency modulation deviation word and to said source of digital information signal for controlling the magnitude of said frequency modulator deviation word in response to said digital information signal for controlling the instantaneous slope of said digital ramp signal.

9. A modulator according to claim 1 wherein said memory means further comprises:
  addressable random-access memory means including address input terminals coupled to said adding means for being addressed by said frequency-modulated digital sawtooth signals for producing digital signals representative of an analog sinusoidal;
  digital-to-analog conversion means coupled to said addressable random-access memory means for receiving therefrom said digital signals representative of an analog sinusoid for generating a quantized analog sinusoidal; and
  filter means coupled to said digital-to-analog conversion means for receiving said quantized analog sinusoid therefrom for filtering the quantizing noise from said quantized analog sinusoid for generating said frequency-modulated sinusoidal signal.

10. An MSK modulator, comprising:
  a source of MARK and SPACE data signal, each said data bit having a predetermined duration;
  a ramp signal generator coupled to said source of MARK and SPACE data signal for generating a ramp signal having a predetermined slope and a polarity which is positive in response to one of said MARK and SPACE and which is negative in response to other of said MARK and SPACE;
  a sawtooth generator for generating sawtooth signals having a recurrence rate equal to the MSK carrier recurrence rate;
  summing means coupled to said ramp signal generator and to said sawtooth generator for controlling the phase of said sawtooth signals in response to said ramp signal to generate a phase-controlled sawtooth signal, whereby said phase is progressively advanced when said ramp signal has a positive polarity and is progressively retarded when said ramp signal has a negative polarity;
  memory means coupled to said summing means for being addressed by said phase-controlled sawtooth signal, said memory means being preprogrammed at each accessible memory location with a portion of a sinusoid whereby an MSK-modulated signal is generated in which the phase is controlled for linear increment or decrement corresponding to a recurrence rate which is greater or less, respectively, than said MSK carrier recurrence rate.

11. An MSK Modulator according to claim 10, wherein said ramp signal generator comprises:
  a source of a slope signal representative of said slope; and
  accumulating means coupled to said source of slope signal and to said source of MARK and SPACE data signal for integrating said slope signal with a polarity instantaneously controlled by the MARK and SPACE state of said data signal.

12. A modulator according to claim 11, wherein said accumulating means comprises:

a controllable adder/subtractor including a first input terminal coupled to said source of slope signal and a feedback input terminal coupled for receiving a signal, and also including an add/subtract control input terminal coupled to said source of MARK and SPACE data signal for instantaneously adding said slope signal to said signal applied to said feedback terminal when said data signal has one of said MARK and SPACE states and for instantaneously subtracting said slope signal from said signal applied to said feedback terminal when said data signal has the other of said MARK and SPACE states for generating said ramp signal at an output terminal of said adder/subtractor and to said summing means for coupling said ramp signal to said feedback input terminal and to said summing means.

13. A frequency modulator, comprising:

a source of digital information;

a source of increment word;

a clock;

accumulating means coupled to said source of digital information, to said source of increment word and to said clock for accumulating at each clock cycle positive and negative values of said increment word under control of said digital information to form an accumulated signal;

a source of digital sawtooth signals having a recurrence rate;

adding means coupled to said accumulating means and to said source of digital sawtooth signals for adding together said digital sawtooth signals and said accumulated signal to form frequency-modulated sawtooth signals; and memory means coupled to said adding means for receiving said frequency-modulated sawtooth signals therefrom, for addressing memory locations preprogrammed with sinusoid amplitude information for generating a frequency-modulated sinusoidal signal in response to said frequency-modulated sawtooth signal.

14. A modulator according to claim 13, wherein said adding means overflows at the same level as the peak level of said digital sawtooth signal.

15. A modulator according to claim 12 wherein said accumulating means comprises:

summing means coupled to said source of digital information and including a first input terminal coupled to said source of increment word and a second input terminal for summing said increment word with a second digital word applied to said second input terminal with a polarity controlled by said digital information to form an incremented signal; and a register including an input terminal coupled to said summing means for receiving said incremented signal therefrom and an output terminal coupled to said second input terminal of said summing means for coupling said incremented signal to said output terminal to close a loop for forming said accumulated signal.

* * * * *